United States Patent Office 3,235,587
Patented Feb. 15, 1966

3,235,587
PROCESS FOR THE PREPARATION OF TEREPHTHALIC ACID HAVING A HIGH DEGREE OF PURITY
Gioacchino Boffa, Dino Costabello, and Giovanni Maiorano, Novara, Italy, assignors to Montecatini Società Generale per l'Industria Mineraria e Chimica, a corporation of Italy
No Drawing. Filed Aug. 29, 1961, Ser. No. 134,587
Claims priority, application Italy, Sept. 13, 1960, 6,559/60
1 Claim. (Cl. 260—524)

Our invention relates to a process for the preparation of high purity terephthalic acid by oxidation of p-xylene with nitric acid.

It is known that terephthalic acid obtained by oxidation of p-xylene with nitric acid contains various amounts of impurities, which make the purification very difficult. The prevailing impurity consists of p-toluic acid, which is produced by incomplete oxidation of p-xylene to terephthalic acid.

It is also known that by using pure terephthalic acid, it is possible to prepare the polymer polyethylene-terephthalate with ethylene glycol without passing through the methyl ester of the terephthalic acid. Therefore, substantially pure terephthalic acid is a valuable starting material.

Many processes have been proposed for the purification of crude terephthalic acid obtained from the conventional nitric acid oxidation processes. The amount of p-toluic acid in technical grade terephthalic acid varies between 5 and 10% depending on the particular oxidation process.

It is an object of our invention to overcome the above difficulties and obtain high purity terephthalic acid.

The oxidation conditions according to the known processes are generally the following:

(1) Introduction of the p-xylene and of a part of $HNO_3$ into the reaction autoclave;

(2) Heating at the reaction temperature (180–200° C.); said temperature is generally not exceeded, because of the strong corrosions which the stainless steels undergo;

(3) Introduction of a supplementary amount of $HNO_3$ into the autoclave until an excess on the stoichiometric amount is reached.

The nitrous gases may stay in the autoclave or may be partially eliminated.

We have now surprisingly found that by feeding all the necessary $HNO_3$ into the reaction autoclave, and then progressively introducing p-xylene at a temperature in the autoclave of over 150° C., the reaction can be accomplished in such a manner that the concentration of p-toluic acid in the finished terephthalic acid is less than 0.5%. The temperature at which the oxidation is carried out is not higher than 200° C. An excess of 50–100% of the theoretical value of a 10% solution of $HNO_3$ is preferably used. A 5% to 15% solution can also be used. The unreacted acid is recycled and made stronger by adding concentrated $HNO_3$, e.g., 57% $HNO_3$.

Our invention has the advantage that the p-toluic acid which is forming is always dissolved, and the only solid phase present in the autoclave consists of terephthalic acid. Under these conditions, p-toluic acid is more completely oxidized and is a negligible impurity in the finished product. Furthermore, by using diluted nitric acid, there is the advantage to have a lower percentage of nitrocompounds which generally constitute an impurity which is removed with difficulty from the terephthalic acid.

The following examples are given to illustrate the process, but not to limit the scope of the present invention.

*Example 1*

10 kg. of 10% $HNO_3$ are heated at 180° C. into a 17 liter autoclave which is provided with stirrer. 212 g. p-xylene are then introduced by means of a pump over a 45 minute period. In order to bring again the exhausted nitric acid to a concentration of about 10%, 900 g. $HNO_3$ at a concentration of 57% and 212 g. p-xylene are introduced over a 45 minute interval. The exhausted acid is again reusable after further addition of 900 g. of 57% $HNO_3$. The reaction mixture is cooled to room temperature and filtered to give 530 g. of terephthalic acid, containing less than 0.5% p-toluic acid, less than 0.1% nitro-terephthalic acid and only traces of p-aldehydrobenzoic acid. The oxidation is made easier by adding catalytic quantities of powdered Cu and ammonium metavanadate. The reaction is carried out under a pressure of about 40 atmospheres.

*Example 2*

5 kg. of 10% $HNO_3$ are introduced into the autoclave of the preceding example and are heated at 180° C. 480 g. p-xylene are then fed during a 30 minute interval. During the same interval, 2.7 kg. 50% $HNO_3$ are pumped into the autoclave and the mixture is kept at 190–200° C. for one hour. 580 g. terephthalic acid are obtained containing less than 1% p-toluic acid and less than 0.1% nitro-terephthalic acid.

Also in this example the oxidation has been carried out by adding catalytic quantities of powdered Cu and ammonium metavanadate and by carrying out the reaction under a pressure of about 40 atmospheres, though these conditions are not critical but only preferable.

We claim:

A process for preparing terephthalic acid having a high degree of purity, which comprises oxidizing p-xylene with nitric acid, said nitric acid having a concentration between 5% and 15% and with at least 50% theoretical excess, at temperatures between 150° and 200° C., under superatmospheric pressure, said nitric acid being first introduced into a reactor, bringing said reactor to at least 150° C., then said p-xylene being introduced into said reactor.

References Cited by the Examiner
UNITED STATES PATENTS 2,636,899   4/1953   Burrows et al. _____ 260—524
2,970,169   1/1961   Friedlander et al. ____ 260—524

FOREIGN PATENTS 655,074   7/1951   Great Britain.
742,709   1/1956   Great Britain.
766,564   1/1957   Great Britain.

LORRAINE A. WEINBERGER, *Primary Examiner.*
LEON ZITVER, *Examiner.*